3,207,689
METHOD OF REPLACING DEACTIVATED CATALYST IN EXPANDED BED PROCESS
Roger P. Van Driesen, Hopewell, N.J., assignor, by mesne assignments, to Cities Service Research and Development Company, a corporation of Delaware
Filed June 7, 1963, Ser. No. 286,852
4 Claims. (Cl. 208—152)

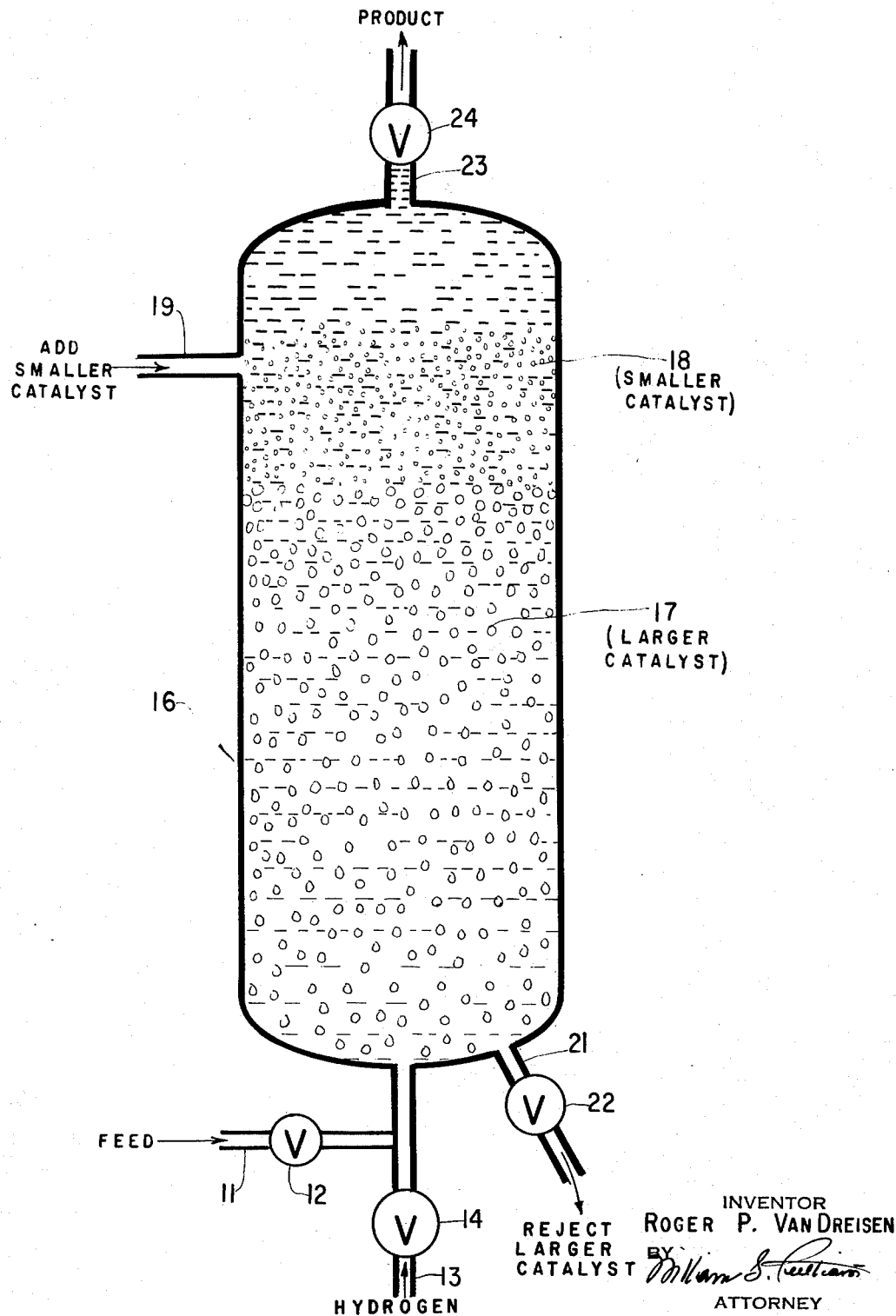

This application is a continuation-in-part of my co-pending application S.N. 121,436, filed July 3, 1961, now abandoned, for Catalyst Replacement.

This invention relates to catalytic treatment of liquid and more particularly to replenishment of catalyst in a process for the catalytic treatment of liquid in which upflowing liquid maintains a bed of finely divided catalyst in an expanded condition. The invention has particular application to processes such as hydrogenation in which liquid hydrocarbon oil is contacted with catalyst which becomes at least partially deactivated over a period of time.

The present invention is applicable to any system in which liquid is treated with an expanded bed of catalyst and it is desired to replace catalyst which has been in the treating vessel the longest period of time. In such processes, liquid or a mixture of liquid and gas is passed upwardly through a bed of catalyst particles at a sufficient velocity to expand the volume of the catalyst bed and cause random movement of catalyst particles but at an insufficient velocity to cause general upward movement or carry over of the catalyst from the bed. Bed expansion in such instances is normally between about 10 and about 300 percent based on the unexpanded volume of the catalyst. In such an expanded bed the catalyst particles are not fixed but are in a state of random motion induced by the velocity of the upflowing fluid. This motion allows a very efficient contact between fluid and catalyst to take place. Such movement is, however, limited to the extent that the violent slugging and mixing typical of a bed of finely divided catalyst fluidized by gas does not take place and the upper portion of the expanded bed of catalyst is usually sharply defined. It has now been found that in such catalyst beds expanded by fluid flow, relatively larger catalyst particles tend to form the lower portion of the catalyst bed while relatively smaller particles tend to form the upper portion of the bed.

In catalytic reactions in which fluid is passed upwardly through an expanded bed of catalyst particles as described above, such as in the treatment of liquid hydrocarbon oil with hydrogen in contact with such an expanded bed of catalyst, it is necessary, due to normal deactivation or contamination of the catalyst, to replace the catalyst from time to time. This may, of course, be accomplished by replacing the entire catalyst inventory at once or may be accomplished by continuous or intermittent withdrawal of partially spent catalyst and replacement with fresh catalyst. Unfortunately, in conventional methods for replacing catalyst, the catalyst withdrawal is necessarily a representative sample of all the catalyst present in the catalyst bed and contains some fresh as well as some spent catalyst. It is, therefore, an object of the present invention to provide a method for replacing catalyst in systems of the type described above in which the relatively older and therefore more deactivated catalyst is selectively removed.

In accordance with the present invention, catalyst maintained in an expanded bed by upflowing liquid may be partially replaced by withdrawing catalyst from the lower portion of the bed and adding catalyst of a smaller particle size to the upper portion of the bed or by withdrawing catalyst from the upper portion of the bed and adding catalyst of a relatively larger particle size to the lower portion of the bed. Due to the tendency of the different particle sizes to remain separated in the expanded bed, the freshly added catalyst is not to any substantial extent mixed with the older catalyst of different particle size and hence is not withdrawn during subsequent withdrawal of further portions of the older catalyst.

When catalyst of the original size has been substantially replaced by the different sized catalyst being added, the process may be reversed and catalyst of the original size again added as the fresh catalyst. For instance, if as described above, relatively larger catalyst is withdrawn from the lower portion of the catalyst bed and relatively smaller catalyst added to the upper portion thereof, then when the relatively larger catalyst has been replaced by the relatively smaller catalyst, the process may be reversed and relatively larger catalyst added to the lower portion of the catalyst bed while the relatively smaller catalyst is withdrawn from the upper portion thereof. This will eventually lead to a condition in which the catalyst bed consists substantially of the relatively larger catalyst of the same size as was originally present and the entire process may then be repeated any desired number of times with the composition of the catalyst bed changing from mostly relatively large sized catalyst to mostly relatively small sized catalyst and back again. In this manner the advantages of the invention may be obtained over many changes of catalyst and the overall catalyst consumption rate for the process will be drastically reduced.

For a better understanding of the invention reference should be had to the accompanying drawing which is a somewhat diagramatic illustration with equipment shown in elevation of a suitable arrangement of apparatus for carrying out a preferred embodiment of the invention in conjunction with the hydrogenation of hydrocarbon oil.

Referring to the dawing, feed oil entering through a conduit 11 and valve 12 and hydrogen entering through a conduit 13 and valve 14 are passed through the conduit 13 into the lower portion of a hydrogenation reactor 16. The reactor 16 contains a bed of finely divided hydrogenation catalyst which is maintained in an expanded condition by upward flow of liquid and hydrogen through the reactor. In the drawing, this hydrogenation catalyst is shown in the form of relatively larger particles which form a lower portion 17 of the expanded bed of catalyst and relatively smaller particles which form an upper portion 18 of the expanded bed of catalyst. Liquid and gaseous product is withdrawn from the reactor as through a conduit 23 and valve 24. When it is desired to replace a portion of the catalyst, larger catalyst may be withdrawn from the lower portion of the catalyst bed as through a conduit 21 and valve 22 while fresh, smaller catalyst may be added to the upper portion of the catalyst bed as through a conduit 19. It is readily apparent that replacement of catalyst in this manner results in selective withdrawal of the relatively larger, older catalyst until substantially the entire catalyst bed is composed of the relatively smaller catalyst. In this manner it is possible to avoid withdrawal of excessive amounts of relatively fresh catalyst as would otherwise occur if the withdrawn catalyst were a representative sample of the entire catalyst inventory in the reactor.

While the catalyst and operating conditions discussed herein relate especially to treatment of hydrocarbon oil with hydrogen, it should be understood that replacement of catalyst in any process for the catalytic treatment of liquid in which the catalyst is maintained in an expanded bed of the type described is within the scope of the invention.

The catalyst employed in the reactor 16 may be any suitable hydrogenation catalyst such as cobalt, iron, molybdenum, nickel, tungsten or cobalt molybdate. Such catalysts as well as their sulfides and oxides may be used alone or together with other suitable catalysts or in combination with each other and all such catalysts may, of course, be supported on suitable bases such as alumina, silica or alumina-silica gel. Such catalyst is present in the form of finely divided particles having a suitable size such as between about $1/100$ and $1/8$ of an inch with particle sizes on the order of $1/64$ to $1/16$ of an inch being more usual. In the practice of the present invention it is necessary that the catalyst in the reactor 16 be expanded to a volume greater than its settled volume by the upward flow of liquid through the reactor. Such bed expansion is preferably at least about 10 percent and may be as much as about 300 percent based on the settled volume of the catalyst. The upward velocity of fluid necessary to accomplish the desired expansion will, of course, depend upon the size and density of catalyst particles used as well as the properties of the fluid flowing upwardly through the reactor. For any given process, it is a relatively simple matter to determine the particular velocity which will cause the catalyst bed to become expanded to the desired extent. As mentioned above such expansion of the catalyst bed results in random motion of the catalyst particles without the somewhat more violent mixing which occurs in catalyst beds fluidized by gas. Expansion of the catalyst bed by liquid as described above allows such random motion without any substantial amount of catalyst being carried upwardly above the upper level of the bed and the upper level of the bed is usually fairly well defined. Due to the above mentioned random motion of catalyst particles unaccompanied by violent mixing, relatively larger particles of the same catalyst tend to remain in the lower portion of the catalyst bed such as the portion 17 of the bed shown in the drawing while relatively smaller catalyst particles tend to form the upper portion of the catalyst bed such as the upper portion 18 of the bed shown in the drawing. While the upward velocity of fluid within the reactor needed to obtain the desired amount of bed expansion will vary widely as discussed above, velocities on the order of 20 to 120 gallons per minute per square foot of reactor cross sectional area are frequently used.

The feed introduced through the conduit 11 as described above may be any suitable hydrocarbon oil and may vary considerably depending upon the particular hydrogenation reaction desired. Hydrogenation reactions may, for instance, vary from relatively mild treatment under relatively lower conditions of temperature and pressure to more severe treatments under relatively higher conditions of temperature and pressure. Mild treatment may be used to achieve improved color or stability and is frequently used to treat relatively light oils such as gas oil while more severe treatment may be used to effect hydrodesulfurization or hydrocracking and is more usually practiced on heavier feeds such as residual fractions.

The space velocity in the reactor 16 may vary widely such as between about 0.5 and about 5.0 volumes of feed per hour per volume of reactor capacity. The space velocity, like the other operating conditions mentioned herein is not, however, completely independent and must be selected with other desired conditions in mind.

Hydrogen is introduced through the conduit 13 in quantities suitable to the particular hydrogenation reaction taking place in the reactor 16 and may, for instance, be introduced at rates between about 2,500 and about 10,000 standard cubic feet per barrel of feed. Likewise, the temperature at which the reactor 16 is maintained will vary widely depending upon the particular reaction taking place as well as upon the feed and other variables with temperatures between about 600° F. and about 900° F. being commonly used. The temperature of the reactor 16 may be maintained in any suitable manner such as by controlling the temperature of the feed entering through conduit 11. The reactor 16 may be maintained under any suitable pressure such as between about 1,500 and about 4,000 p.s.i.g. partial pressure of hydrogen.

As shown in the drawing, catalyst may be replaced in accordance with the present invention by withdrawing relatively larger catalyst from the lower portion of the expanded bed of catalyst and adding relatively smaller catalyst to the upper portion thereof. While the difference in size between the relatively larger and relatively smaller catalyst may, of course, vary quite widely, it is possible that if the difference in size is too small an undesirable amount of mixing between the two different sizes of catalyst will take place while if the difference in catalyst sizes is too large it may become difficult to find a velocity capable of expanding both catalyst sizes approximately the desired amount. In general, it is, therefore, preferred that the relatively larger catalyst particles be between about 5/4 and about 3 times the size of the relatively smaller catalyst.

EXAMPLE

The following specific example illustrates the practical application of the present invention using the process and apparatus described above and shown in the drawing in the hydrocracking of a heavy residual oil.

In this example the feed is a West Texas long residual having a gravity of 16.3° API and containing 2.6 weight percent sulfur. This feed is introduced through the conduit 11 while hydrogen is introduced through the conduit 12 at the rate of 6,000 standard cubic feet per barrel of feed. The catalyst employed in the reactor 16 is cobalt-molbydenum hydrogenation catalyst on an alumina base. The catalyst initially present in the reactor at the start of the process has a particle size of $1/16$ inch. The reactor 16 is maintained under a hydrogen partial pressure of 2,000 p.s.i.g. and a temperature of 820° F. The space velocity is about 3.0 volumes of feed per hour per volume of reactor space. Liquid is passed upwardly through the reactor 16 at the rate of 75 gallons per minute per square foot of reactor cross sectional area, thereby expanding the bed of catalyst by about 50 percent based on the settled volume of the catalyst. After the unit has been on stream for 50 days, replacement of catalyst is begun by continuously or semi-continuously withdrawing catalyst from the lower portion of the catalyst bed through the conduit 21 and valve 22 and replacing thus withdrawn catalyst with fresh catalyst having a particle size of $1/32$ of an inch introduced through conduit 19 into the upper portion of the catalyst bed. Such catalyst addition and withdrawal is continued at a rate sufficient to maintain the average age of catalyst in the reactor 16 at 50 days. Under these conditions the liquid product removed through conduit 23 has a gravity of 25° API and contains 0.6 weight percent sulfur. Product yield is 102 volume percent based on feed.

Table I below demonstrates more clearly the benefit to be gained by replacing catalyst as described above rather than by withdrawing a represeitative mixture of all catalyst in the reactor in accordance with normal procedure.

*Table 1.—Catalyst replacement rate using two catalyst sizes with daily replacement to maintain an average age of 50 days*

| Days on stream | Larger catalyst | | Smaller catalyst | | Percent of total cat. replaced | Av. age tot. cat. |
|---|---|---|---|---|---|---|
| | Age | Percent of total catalyst | Av. age | Percent of total catalyst | | |
| 50 | 50 | 100.0 | 0 | 0 | 0.0 | 50 |
| 51 | 51 | 98.0 | 0 | 2.0 | 2.0 | 49.98 |
| 52 | 52 | 96.0 | 0.5 | 4.0 | 2.0 | 49.94 |
| 53 | 53 | 94.0 | 1.0 | 6.0 | 2.0 | 49.88 |
| 54 | 54 | 92.1 | 1.52 | 7.9 | 1.9 | 49.85 |
| 55 | 55 | 90.3 | 2.05 | 9.7 | 1.8 | 49.87 |
| 56 | 56 | 88.6 | 2.60 | 11.4 | 1.7 | 49.92 |
| 57 | 57 | 87.0 | 3.16 | 13.0 | 1.6 | 50.00 |
| 58 | 58 | 85.4 | 3.70 | 14.6 | 1.6 | 50.07 |
| 59 | 59 | 83.8 | 4.23 | 16.2 | 1.6 | 50.13 |
| 60 | 60 | 82.2 | 4.76 | 17.8 | 1.6 | 50.17 |
| 61 | 61 | 80.6 | 5.29 | 19.4 | 1.6 | 50.20 |
| 62 | 62 | 79.0 | 5.81 | 21.0 | 1.6 | 50.20 |
| 63 | 63 | 77.4 | 6.33 | 22.6 | 1.6 | 50.19 |
| 64 | 64 | 75.8 | 6.85 | 24.2 | 1.6 | 50.17 |
| 65 | 65 | 74.2 | 7.36 | 25.8 | 1.6 | 50.13 |
| 66 | 66 | 72.6 | 7.88 | 27.4 | 1.6 | 50.08 |
| 67 | 67 | 71.1 | 8.42 | 28.9 | 1.5 | 50.07 |
| 68 | 68 | 69.6 | 8.96 | 30.4 | 1.5 | 50.05 |
| 69 | 69 | 68.2 | 9.52 | 31.8 | 1.4 | 50.09 |
| 70 | 70 | 66.8 | 10.08 | 33.2 | 1.4 | 50.11 |
| 71 | 71 | 65.4 | 10.63 | 34.6 | 1.4 | 50.11 |
| 72 | 72 | 64.0 | 11.18 | 36.0 | 1.4 | 50.10 |
| 73 | 73 | 62.6 | 11.72 | 37.4 | 1.4 | 50.08 |
| 74 | 74 | 61.2 | 12.26 | 38.8 | 1.4 | 50.05 |
| 75 | 75 | 59.9 | 12.83 | 40.1 | 1.3 | 50.07 |
| 76 | 76 | 58.6 | 13.40 | 41.4 | 1.3 | 50.09 |
| 77 | 77 | 57.3 | 13.96 | 42.7 | 1.3 | 50.08 |
| 78 | 78 | 56.0 | 14.52 | 44.0 | 1.3 | 50.07 |
| 79 | 79 | 54.7 | 15.07 | 45.3 | 1.3 | 50.04 |
| 80 | 80 | 53.4 | 15.62 | 46.6 | 1.3 | 50.00 |
| 81 | 81 | 52.2 | 16.20 | 47.8 | 1.2 | 50.02 |
| 82 | 82 | 51.0 | 16.78 | 49.0 | 1.2 | 50.04 |
| 83 | 83 | 49.8 | 17.35 | 50.2 | 1.2 | 50.04 |
| 84 | 84 | 48.6 | 17.92 | 51.4 | 1.2 | 50.03 |
| 85 | 85 | 47.4 | 18.49 | 52.6 | 1.2 | 50.02 |
| 86 | 86 | 46.2 | 19.06 | 53.8 | 1.2 | 49.98 |
| 87 | 87 | 45.1 | 19.66 | 54.9 | 1.1 | 50.03 |
| 88 | 88 | 44.0 | 20.26 | 56.0 | 1.1 | 50.07 |
| 89 | 89 | 42.9 | 20.85 | 57.1 | 1.1 | 50.09 |
| 90 | 90 | 41.8 | 21.44 | 58.2 | 1.1 | 50.10 |
| 91 | 91 | 40.7 | 22.02 | 59.3 | 1.1 | 50.10 |
| 92 | 92 | 39.6 | 22.60 | 60.4 | 1.1 | 50.08 |
| 93 | 93 | 38.5 | 23.18 | 61.5 | 1.1 | 50.07 |
| 94 | 94 | 37.4 | 23.75 | 62.6 | 1.1 | 50.03 |
| 95 | 95 | 36.3 | 24.32 | 63.7 | 1.1 | 49.98 |
| 96 | 96 | 35.2 | 24.89 | 64.8 | 1.1 | 49.92 |
| 97 | 97 | 34.2 | 25.50 | 65.8 | 1.0 | 49.95 |
| 98 | 98 | 33.2 | 26.10 | 66.8 | 1.0 | 49.97 |
| 99 | 99 | 32.2 | 26.70 | 67.8 | 1.0 | 49.98 |
| 100 | 100 | 31.2 | 27.30 | 68.8 | 1.0 | 49.98 |
| 101 | 101 | 30.21 | 27.90 | 69.79 | 0.99 | 49.98 |
| 102 | 102 | 29.23 | 28.50 | 70.77 | 0.98 | 49.98 |
| 103 | 103 | 28.3 | 29.12 | 71.7 | 0.93 | 50.03 |
| 104 | 104 | 27.4 | 29.75 | 72.6 | 0.90 | 50.10 |
| 105 | 105 | 26.5 | 30.37 | 73.5 | 0.90 | 50.15 |
| 106 | 106 | 25.6 | 30.99 | 74.4 | 0.90 | 50.20 |
| 107 | 107 | 24.7 | 31.61 | 75.3 | 0.90 | 50.23 |
| 108 | 108 | 23.8 | 32.23 | 76.2 | 0.90 | 50.26 |
| 109 | 109 | 22.9 | 32.84 | 77.1 | 0.90 | 50.28 |
| 110 | 110 | 22.0 | 33.45 | 78.0 | 0.90 | 50.29 |
| 111 | 111 | 21.1 | 34.06 | 78.9 | 0.90 | 50.29 |
| 112 | 112 | 20.2 | 34.66 | 79.8 | 0.90 | 50.28 |
| 113 | 113 | 19.3 | 35.26 | 80.7 | 0.90 | 50.26 |
| 114 | 114 | 18.4 | 35.86 | 81.6 | 0.90 | 50.24 |
| 115 | 115 | 17.5 | 36.45 | 82.5 | 0.90 | 50.20 |
| 116 | 116 | 16.6 | 37.05 | 83.4 | 0.90 | 50.16 |
| 117 | 117 | 15.7 | 37.64 | 84.3 | 0.90 | 50.10 |
| 118 | 118 | 14.8 | 38.23 | 85.2 | 0.90 | 50.03 |
| 119 | 119 | 13.9 | 38.82 | 86.1 | 0.90 | 49.96 |
| 120 | 120 | 13.0 | 39.51 | 87.0 | 0.90 | 49.97 |
| 121 | 121 | 12.1 | 40.10 | 87.9 | 0.90 | 49.89 |
| 122 | 122 | 11.2 | 40.68 | 88.8 | 0.90 | 49.78 |
| 123 | 123 | 10.3 | 41.26 | 89.7 | 0.90 | 49.68 |
| 124 | 124 | 9.5 | 41.89 | 90.5 | 0.80 | 49.69 |
| 125 | 125 | 8.7 | 44.51 | 91.3 | 0.80 | 49.69 |
| 126 | 126 | 7.9 | 43.13 | 92.1 | 0.80 | 49.67 |
| 127 | 127 | 7.2 | 43.80 | 92.8 | 0.70 | 49.79 |
| 128 | 128 | 6.5 | 44.46 | 93.5 | 0.70 | 49.89 |
| 129 | 129 | 5.8 | 45.12 | 94.2 | 0.70 | 49.98 |
| 130 | 130 | 5.1 | 45.78 | 94.9 | 0.70 | 50.08 |
| 131 | 131 | 4.4 | 46.44 | 95.6 | 0.70 | 50.16 |
| 132 | 132 | 3.7 | 47.09 | 96.3 | 0.70 | 50.23 |
| 133 | 133 | 3.0 | 47.74 | 97.0 | 0.70 | 50.30 |
| 134 | 134 | 2.2 | 48.34 | 97.8 | 0.80 | 50.23 |
| 135 | 135 | 1.4 | 48.94 | 98.6 | 0.80 | 50.14 |
| 136 | 136 | 0.7 | 49.59 | 99.3 | 0.70 | 50.19 |
| 137 | 137 | 0.0 | 50.24 | 100.0 | 0.70 | 50.24 |

Total days to replace catalyst charge using two sizes _____ 86
Total days to replace catalyst charge using one size with completing mixing _____ 50
Catalyst consumption using two sizes/catalyst consumption using one size _____ 0.575

From Table I it is apparent that with selective withdrawal of relatively older and therefore more deactivated catalyst and replacement with fresh catalyst by making use of the tendency of relatively larger catalyst to form the lower portion of an expanded catalyst bed and relatively smaller catalyst to form the upper portion thereof, the total amount of fresh catalyst required to maintain catalyst activity is substantially reduced. Specifically, Table I shows that in the example given above the total catalyst charge need be replaced only once each 86 days to maintain an average catalyst life of 50 days. By contrast, if the withdrawn catalyst is a representative sample of the total catalyst inventory in accordance with conventional practice, than a total fresh charge of catalyst must be added every 50 days. Catalyst consumption utilizing the present invention is, therefore, only a little more than half of the catalyst consumption using only one size of catalyst in accordance with conventional practice.

While the invention is described herein in conjunction with a process in which relatively larger catalyst is withdrawn from the lower portion of an expanded bed of catalyst and relatively smaller catalyst is added to the upper portion thereof, it will be understood that numerous variations of this process are within the scope of the invention. For instance, it is equally feasible to withdraw relatively smaller catalyst from the upper portion of the expanded bed and add relatively larger catalyst to the lower portion thereof. It is also, of course, feasible to utilize a process of the type described herein as one stage in a multi-stage treatment process.

It is also, as described above, possible to obtain the advantages of the invention on a continuous basis through many changes of catalyst by alternating addition of relatively larger and relatively smaller catalyst so that the composition of the catalyst bed is constantly changing from mostly one sized catalyst to mostly the other sized catalyst. For instance, in the above example, after the relrelatively larger 1/16 in. catalyst has been substantially completely replaced with the relatively smaller 1/32 in. catalyst, the process may be reversed with the smaller 1/32 in. catalyst being withdrawn from the upper portion of the catalyst bed and the larger 1/16 in. catalyst being added to the lower portion thereof. Then after the catalyst bed is again composed mostly of the larger 1/16 in. catalyst, withdrawal of the larger catalyst and addition of the smaller catalyst may again take place. This process may, of course, be repeated as many times as desired and the benefits of low catalyst consumption as outlined above will be maintained for so long as addition and withdrawal in this manner is continued.

It will also be apparent to those skilled in the art that various other changes and modifications may be made without departing from the spirit and scope of the invention and it is intended to cover all such changes and modifications in the appended claims.

I claim:

1. In a process for the treatment of hydrocarbon oil in which liquid hydrocarbon oil is passed upwardly through a bed of catalyst particles at a velocity sufficient to expand the volume of said bed of catalyst between about 10 and about 300 percent based on the unexpanded volume of the bed and in which said catalyst becomes at least partially deactivated, the method of replacing thus deactivated catalyst which comprises withdrawing catalyst of a relatively larger average particle size from a lower portion of said bed and adding catalyst of a relatively smaller average particle size to an upper portion of said bed until the majority of the catalyst of said relatively larger average particle size has been replaced with said catalyst of relatively smaller particle size, and then withdrawing catalyst of a relatively smaller average particle size from an upper portion of said bed and adding catalyst of a relatively larger average particle size to a lower portion of said bed until the majority of the catalyst of said relatively smaller average particle size has been replaced by said catalyst of relatively larger average particle size, the particles of said catalyst of relatively larger particle size being in each case between about 5/4 and about 3 times the size of the particles of said catalyst of relatively smaller particle size and said catalyst in each case having an average particle size between about 1/100 and about 1/8 of an inch.

2. In a process for the treatment of hydrocarbon oil in which liquid hydrocarbon oil is passed upwardly through a bed of catalyst particles at a velocity sufficient to expand the volume of said bed of catalyst between about 10 and about 300 percent based on the unexpanded volume of the bed and in which said catalyst becomes at least partially deactivated, the method of replacing thus deactivated catalyst which comprises withdrawing catalyst of a relatively smaller average particle size from an upper portion of said bed and adding catalyst of a relatively larger average particle size to a lower portion of said bed until the majority of the catalyst of said relatively smaller average particle size has been replaced with said catalyst of relatively larger particle size, and then withdrawing catalyst of a relatively larger average particle size from a lower portion of said bed and adding catalyst of a relatively smaller average particle size to an upper portion of said bed until the majority of the catalyst of said relatively average particle size has been replaced by said catalyst of relatively smaller average particle size, the particles of said catalyst of relatively larger particle size being in each case between about 5/4 and about 3 times the size of the particles of said catalyst of relatively smaller particle size and said catalyst in each case having an average particle size between about 1/100 and about 1/8 of an inch.

3. The method of replacing at least partially deactivated catalyst in a bed of finely divided catalyst particles maintained in an expanded condition by movement of fluid upwardly therethrough which comprises withdrawing at least partially deactivated catalyst of a relatively larger average particle size from a lower portion of said bed and adding catalyst of a relatively smaller average particle size to an upper portion of said bed, and then withdrawing catalyst of a relatively smaller average particle size from an upper portion of said bed and adding catalyst of a relatively larger average particle size to a lower portion of said bed.

4. The method of replacing at least partially deactivated catalyst in a bed of finely divided catalyst particles maintained in an expanded condition by movement of fluid upwardly therethrough which comprises withdrawing at least partially deactivated catalyst of a relatively smaller particle size from an upper portion of said bed and adding catalyst of a relatively larger particle size to a lower portion of said bed, and then withdrawing catalyst of a relatively larger average particle size from a lower portion of said bed and adding catalyst of a relatively smaller average particle size to an upper portion of said bed.

References Cited by the Examiner
UNITED STATES PATENTS

| | | | |
|---|---|---|---|
| 2,706,167 | 4/55 | Harper et al. | 208—264 |
| 2,910,433 | 10/59 | Pichler | 208—216 |
| 2,987,467 | 6/61 | Keith et al. | 208—216 |
| 2,987,468 | 6/61 | Chervenak | 208—217 |

ALPHONSO D. SULLIVAN, *Primary Examiner.*